US 8,265,176 B2

(12) United States Patent
Blasco Claret et al.

(10) Patent No.: US 8,265,176 B2
(45) Date of Patent: Sep. 11, 2012

(54) METHOD FOR THE SPECTRAL CONFIGURATION OF SIGNALS MODULATED BY MEANS OF ORTHOGONAL FREQUENCY DIVISION MULTIPLEXING (OFDM) FOR AN ELECTRICAL NETWORK

(75) Inventors: Jorge Vicente Blasco Claret, Valencia (ES); Juan Carlos Riveiro Insúa, Valencia (ES); Salvador Iranzo Molinero, Valencia (ES); José Abad Molina, Vélez (ES)

(73) Assignee: Marvell Hispania, S.L.U., Madrid (ES)

( * ) Notice: Subject to any disclaimer, the term of this patent is extended or adjusted under 35 U.S.C. 154(b) by 1093 days.

(21) Appl. No.: 11/264,621

(22) Filed: Nov. 1, 2005

(65) Prior Publication Data

US 2006/0062318 A1 Mar. 23, 2006

Related U.S. Application Data

(63) Continuation of application No. PCT/ES2004/000173, filed on Apr. 22, 2004.

(30) Foreign Application Priority Data

May 6, 2003 (ES) .................................. 200301022

(51) Int. Cl.
*H04K 1/10* (2006.01)
(52) U.S. Cl. ........................................ 375/260; 370/464
(58) Field of Classification Search .................. 375/260, 375/295; 370/210, 465, 464, 466, 467, 468, 370/480, 208; 708/404, 405
See application file for complete search history.

(56) References Cited

U.S. PATENT DOCUMENTS

| | | | |
|---|---|---|---|
| 5,790,516 A | 8/1998 | Gudmundson et al. | |
| 6,175,550 B1 | 1/2001 | van Nee | |
| 6,377,632 B1 * | 4/2002 | Paulraj et al. | 375/299 |
| 6,421,396 B1 * | 7/2002 | Hawley et al. | 375/308 |
| 6,484,029 B2 * | 11/2002 | Hughes et al. | 455/434 |
| 6,563,862 B1 * | 5/2003 | Knutson et al. | 375/219 |
| 6,778,596 B1 * | 8/2004 | Tzannes | 375/222 |
| 7,295,626 B2 * | 11/2007 | Chayat | 375/295 |
| 2002/0105901 A1 * | 8/2002 | Chini et al. | 370/206 |
| 2003/0235147 A1 | 12/2003 | Walton et al. | |
| 2004/0142696 A1 * | 7/2004 | Saunders et al. | 455/450 |
| 2004/0152418 A1 * | 8/2004 | Sinha et al. | 455/42 |
| 2004/0214539 A1 * | 10/2004 | Rajamani et al. | 455/161.1 |
| 2005/0143027 A1 * | 6/2005 | Hiddink et al. | 455/127.1 |

FOREIGN PATENT DOCUMENTS

| | | |
|---|---|---|
| WO | WO 01/76110 A2 | 10/2001 |
| WO | WO 02/37706 A1 | 5/2002 |

OTHER PUBLICATIONS

"2.4 GHz and 5 GHz WLAN: Competing or Complementary?", Mobilian Corporation, Oregon, 2001.*

* cited by examiner

*Primary Examiner* — Aristocratis Fotakis

(57) ABSTRACT

It is characterized in that, maintaining the sampling frequency of the digital-analog converter of the transmitter and the analog-digital converter of the receiver, the bandwidth, the spectral position of the OFDM signal, the shape of the spectrum of the OFDM signal that is transmitted, the level of the spectrum of the OFDM signal that is transmitted, or any combination of the above, are selectively and independently varied for the transmission path and for the reception path, in order to permit the configuration of the spectrum of the OFDM signal in terms of bandwidth, position in frequency and power transmitted for being adapted to the regulations of different countries and to the channels found in the different sections of the electrical network. All these changes are carried out without affecting the analog components of the system, in other words, with the same physical implementation.

19 Claims, 3 Drawing Sheets ated herein by reference in their entireties.
METHOD FOR THE SPECTRAL CONFIGURATION OF SIGNALS MODULATED BY MEANS OF ORTHOGONAL FREQUENCY DIVISION MULTIPLEXING (OFDM) FOR AN ELECTRICAL NETWORK

RELATED APPLICATIONS

The present application is a Continuation of co-pending PCT Application No. PCT/ES2004/000173, filed Apr. 22, 2004, which in turn, claims priority from Spanish Application Serial No. 200301022, filed May 6, 2003. Applicants claim the benefits of 35 U.S.C. §120 as to the PCT application and priority under 35 U.S.C. §119 as to said Spanish application, and the entire disclosures of both applications are incorporated herein by reference in their entireties.

OBJECT OF THE INVENTION

As stated in the title of this specification, the present invention refers to a spectral configurability procedure for signals modulated by orthogonal frequency division multiplexing (OFDM), which is applicable to communications systems using the electrical network as a transmission medium. With the procedure of the invention, the signal is adapted to the characteristics of the channel and to the regulations established by the law in force in different countries for the transmission of signals via the electrical network.

BACKGROUND OF THE INVENTION

In the majority of telecommunication systems it is an advantage to have means for configuring the spectral characteristics of the signal, in order to be adapted to future regulations or regulations in force in different countries and to the characteristics of the channel.

The procedure forming the object of the invention is especially designed for use with signals modulated by orthogonal frequency division multiplexing (OFDM), which are known in the state of the art.

There exist antecedents in the state of the art on scalable procedures of modulation for OFDM signals like that described in U.S. Pat. No. 6,175,550 "Orthogonal frequency division multiplexing system with dynamically scalable operating parameters and method thereof", in which an OFDM system is described which varies the time of the OFDM symbol or, equivalently, the bandwidth of the signal and the cyclic prefix in a dynamic way on the basis of measurements made by the receiver. The problem is that, in order to vary the symbol time, the sampling frequency of the signal in the converters is varied, which makes it necessary to vary the design of the analog components which are conventionally located after the digital-analog converter (DAC) of the transmitters and before the analog-digital converter (ADC) of the receivers. This is due to the fact that the spectral positions of the signal and of its responses depend on the sampling frequency, which means that the necessary filtering characteristics are different as that frequency varies. The procedure forming the object of the invention solves the problem and manages to get the variation in the duration of the OFDM symbol to be done without varying the design of the analog components, since the frequency of the converters is not varied.

DESCRIPTION OF THE INVENTION

In order to achieve the objectives and avoid the drawbacks stated above, the invention consists of a spectral configurability procedure for signals modulated by orthogonal frequency division multiplexing (OFDM) for the electrical network, which comprises the sending and reception of signals by means of OFDM modulation via the electrical network, and is characterized by the fact that the bandwidth and the spectral position of the OFDM signal, the shape and level of the spectrum of the OFDM signal that is transmitted, or any combination of these, are varied independently for the transmission path and for the reception path. All these parameters are changed without varying the sampling frequency of the digital-analog converter of the transmitter and the analog-digital converter of the receiver. In this way, the communications system can be adapted to the regulations of each country both in the range of frequencies and in the injected or radiated power, and to the type of channel.

The variation in the bandwidth of the signal in transmission is done by means of an interpolation with a configurable interpolation factor which is a function of the required variation, and in reception it is done by means of decimating with a factor that is likewise configurable.

In order to locate the spectrum of the signal in the desired position, the procedure carries out a digital band translation with a variable frequency, whose value is a function of the desired position.

The procedure of the invention provides for the use of a power mask in order to select the level of the signal of each carrier (carrier to carrier), which permits the attenuation of the channel to be precompensated and the carriers to be eliminated, which in turn narrows the bandwidth of the signal and creates gaps in the signal spectrum, achieving the shape and level desired for that spectrum in accordance with the requirements set down in each country.

In order to attenuate the side lobes of the signal and achieve more abrupt spectral gaps, the OFDM symbols in the time domain are multiplied by a raised cosine window.

The procedure of the invention enables a communication system to be obtained via the electrical network in which the communication is done with spectra independent of the OFDM signal for transmission and reception in terms of bandwidth, spectral location, shape and level of the signal.

It is also possible for various independent systems using different bandwidths, spectral location, shape and size of the signal to communicate with equipment simultaneously following their same communication system, sharing the channel by means of frequency division multiplexing.

Finally, it is also possible to vary the duration of the cyclic prefix which conventionally precedes each symbol of the OFDM signal, in such a way that the system can be adapted to the type of channel.

With all this, the communication systems via the electrical network are successfully adapted to the norms and regulations of the different countries and to the different types and topologies of channel, without variations in the physical implementation of the system.

Below, in order to facilitate a better understanding of this specification and forming an integral part thereof, some figures are included in which the object of the invention has been represented in a manner that is illustrative rather than limiting.

DESCRIPTION OF AN EMBODIMENT OF THE INVENTION

Given below is a description of an example of the invention, making reference to the numbering adopted in the figures.

When designing communications systems via the electrical network, we are faced with a lack of common norms on the frequency ranges that can be used for each service and the power spectral density that can be injected into the line. These norms change from one country to another, and there are even cases in which they have not yet been defined. In other cases, it is necessary to design a system that is adapted to different scenarios of use, such as access, local area network or transport or trunk network, in which the needs are also different. In order to solve all these problems, the procedure of the invention proposes a method for being able to adapt the characteristics of the signal of a transmission system via the electrical network to each specific case, varying solely the digital parameters of configuration, in other words, with the same physical embodiment of the system.

The present procedure enables the bandwidth and the position of the OFDM signal to be varied independently for transmission and reception, along with the shape and level of the signal spectrum and the cyclic prefix of the OFDM signal in transmission.

Figure 1:
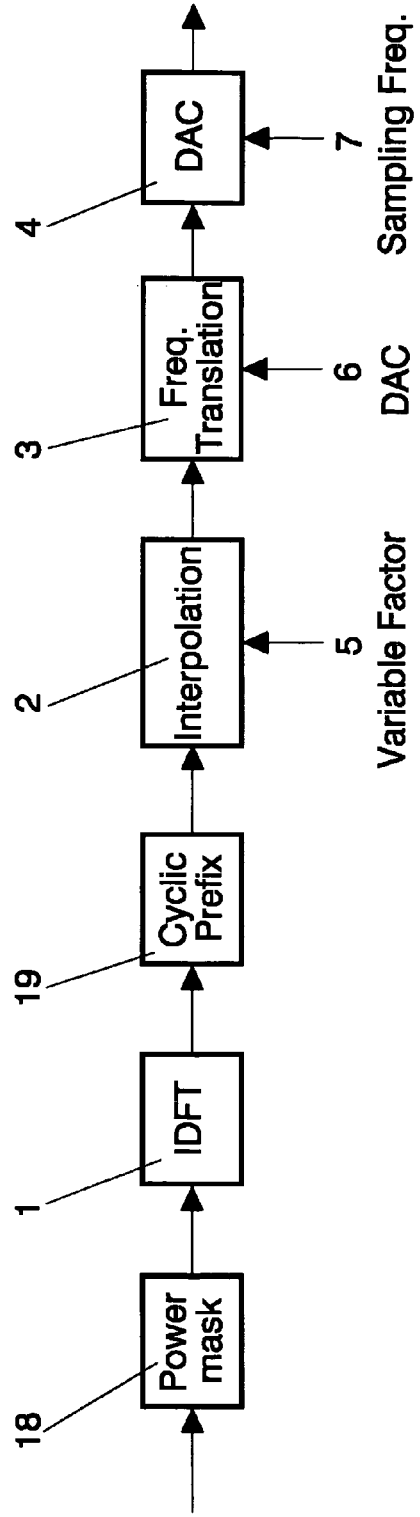
FIG. 1. Represents a block diagram of a transmitter functioning in accordance with the procedure of the invention.
Figure 2:
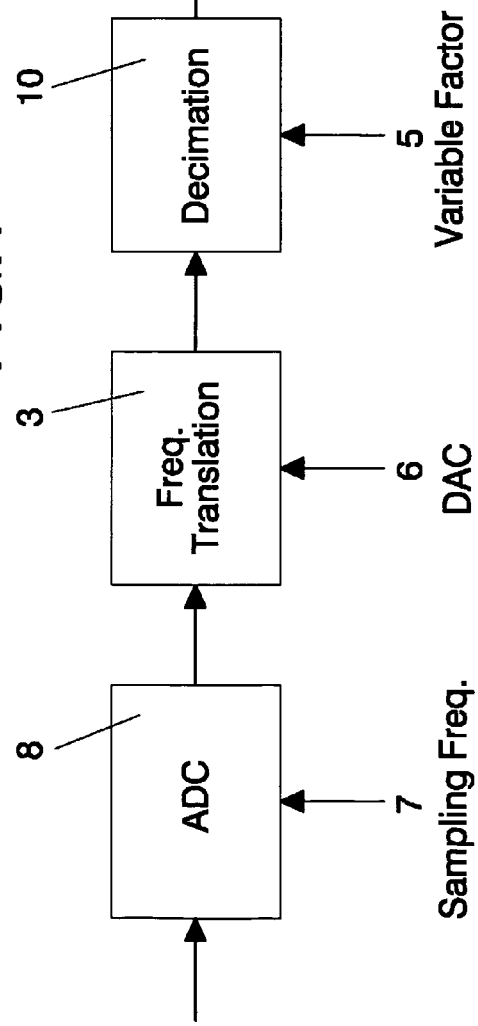
FIG. 2. Represents a block diagram of a receiver functioning in accordance with the procedure of the invention.

In order to carry out this process in transmission a block diagram is used like that shown in FIG. 1, in which a block (18) is observed which applies the power mask on the signal, after which appears a block (1) which performs the inverse Fourier transform (IDFT), which is conventionally used for carrying out OFDM modulation, and a block (19) which inserts the cyclic prefix and multiplies the signal by a raised cosine window. At the output from this block, an interpolation (2) is carried out of the signal with a variable factor (5) in order to vary the bandwidth. As the procedure of the invention does not affect the sampling frequency (7) of the digital-analog converter (DAC) (4), in other words it stays fixed, the larger the interpolation factor (5) the greater the number of samples per symbol, which means that the symbol time is greater and the bandwidth occupied by the signal is less, and vice versa, with a smaller interpolation factor a larger bandwidth is obtained. In order to carry out this interpolation by a variable factor, various interpolators of different factors can be used, which, moreover, can be combined together to obtain other factors. Once the signal with the desired bandwidth has been obtained, it needs to be located in the appropriate spectral position. To achieve this, a translation is carried out in the digital band by means of the block (3) which has a variable translation frequency (6) for carrying out the required translation. After that, the digital signal is converted to analog signal by means of a converter (4) of fixed frequency (7).

In reception, the process is carried out in reverse. The OFDM analog signal is received and converted into a digital signal by means of an analog-digital converter (8) which, in this example of embodiment, samples the signal at the same fixed frequency (7) used in the transmitter. After that, the band translation is carried out in order to pass the signal received in bandpass to baseband by means of the block (3) with a translation frequency which, in this example of embodiment, coincides with the translation frequency (6) used in transmission. Afterwards, the signal is decimated (10) by a variable factor, which in this example of embodiment coincides with the interpolation factor used in transmission (5), whose value is selected in such a way that the same number of samples for each symbol arrives at the block (11) that is performing the Fourier transform (DFT).

In this entire process the transmission and reception parameters in the same node do not need to be equal.

In order to configure the power level or power spectral density of the signal to transmit, one power mask per carrier is used, which in FIG. 1 is applied in the block (18), in other words, before passing the signal to the time domain with the block (1). In other words, when the OFDM symbol is generated in frequency, each carrier is multiplied by a value which determines the power of that carrier. As that power is relative to the other carriers, since it will be the analog components that determine the final power of the signal, this value stands between zero and one, where zero corresponds to eliminating the carrier and one corresponds to the maximum power, with those values or any other intermediate value being able to be used.

Figure 3:
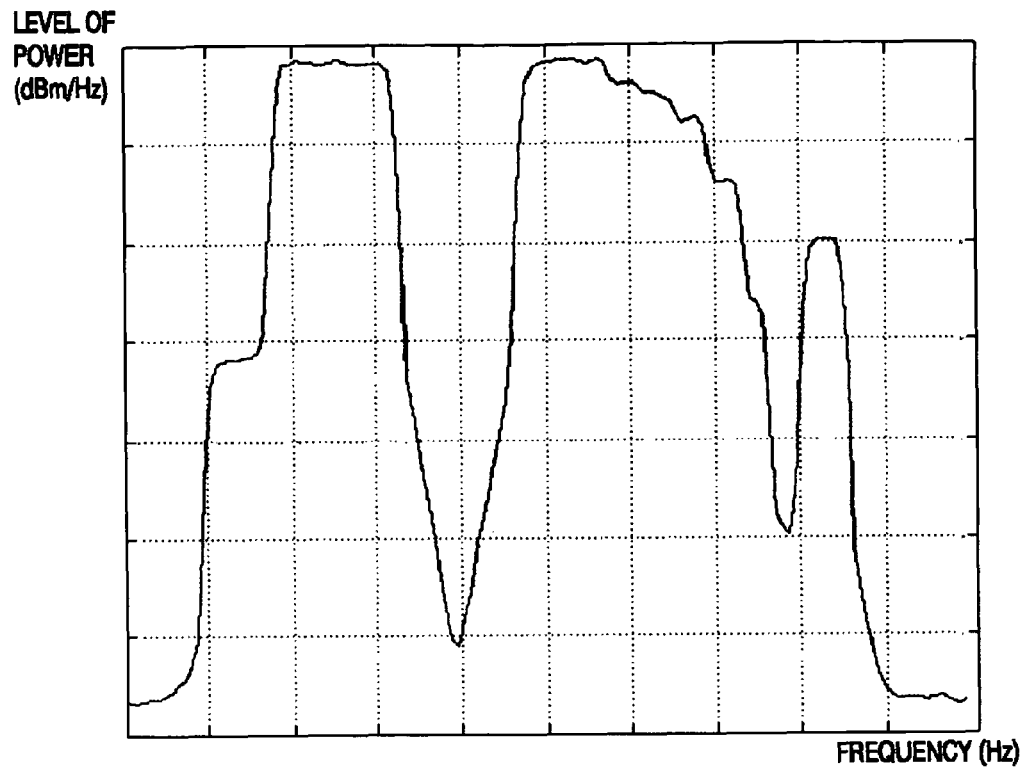
FIG. 3. Represents the power spectral density (PSD) of the transmitted signal.

In some cases, it might be of interest to eliminate certain carriers in order to generate gaps in the spectrum. These gaps can be necessary for not interfering with other communication services using the same frequencies, such as amateur radio enthusiasts, for example. It can also be stated that the frequencies of these gaps vary in different countries. Carriers can also be eliminated from the ends of the bands in order to reduce the bandwidth of the signal. The intermediate values of the power mask can be used for compensating the effects of the channel. The majority of channels attenuate high frequencies more so than lower ones. The power mask can be used to give more power to high carriers in such a way that all the carriers arrive at the receiver with a similar power. A spectrum generated with an arbitrary shape is illustrated in FIG. 3, in which the different levels of power injected for each frequency can be seen.

Figure 4:
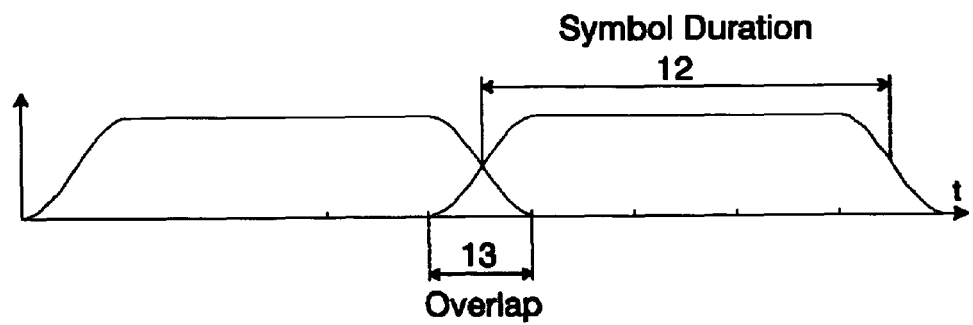
FIG. 4. Represents the windows in a raised cosine used in two consecutive symbols.

The elimination of carriers within the band does not imply that the power injected at those frequencies is zero, since there exists power due to the side lobes of the adjacent carriers. These side lobes appear due to the transitions between the symbols of the OFDM signal and, in order to reduce them, each OFDM symbol in the time domain can be multiplied by a raised cosine window, which in FIG. 1 is carried out by the block (19), which inserts the cyclic prefix in a configurable way and multiplies the signal to be transmitted by a raised cosine window. FIG. 4 shows the shape of that window for two consecutive symbols. The effective duration of a symbol is a time (12) and it can be seen that there is a certain overlap (13) between symbols. In this way, by applying the raised cosine window, a smaller number of carriers need to be eliminated in order to achieve a particular depth of gap in the spectrum.

Figure 5:
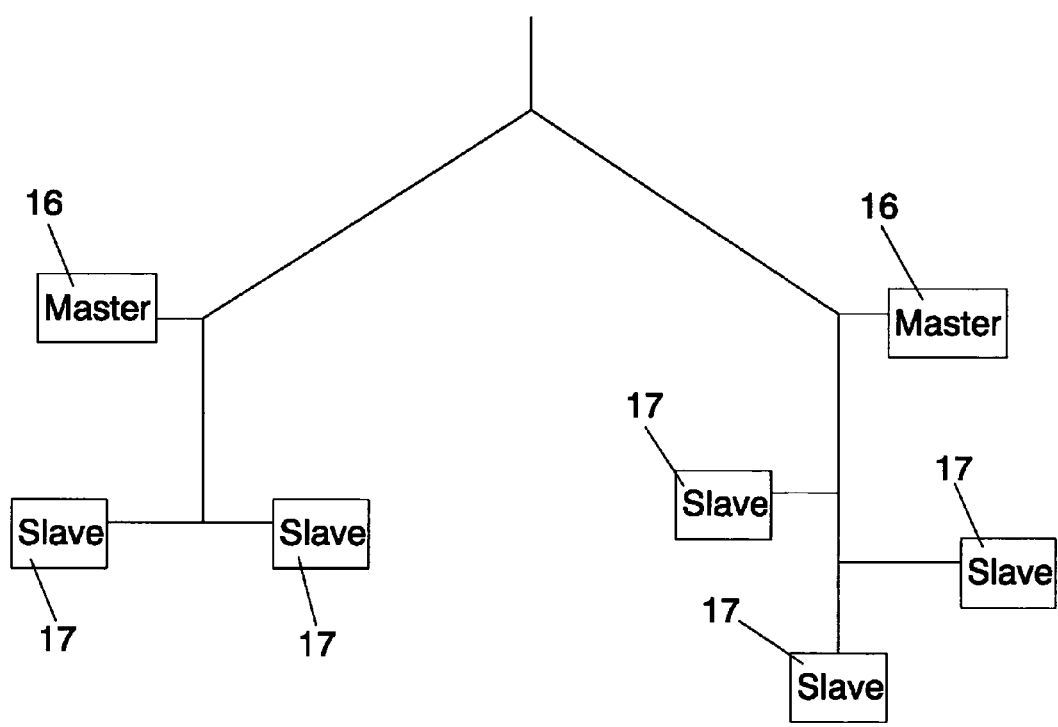
FIG. 5. Represents two sets of nodes using frequency division multiplexing with different parameters in transmission and reception.

The procedure of the invention permits a node to be had which transmits using certain frequencies and receives via others. Obviously, any node wishing to communicate with this one will have to function with the transmission and reception frequencies inverted with respect to the first node. This is an advantage in a tree-type channel topology like that shown in FIG. 5, which is common in the low-tension electrical network, in which all the nodes hanging from a single branch communicate with the base of that branch. If it is required to provide a service in two branches of the tree, this can be done by locating a node (16) in the base of each of the branches. These nodes transmit in one range of frequencies and receive in another, in such a way that they cannot communicate with each other, but nor can they interfere with each other. In each of the branches, other nodes (17) hang which communicate with their master (16). The transmission of a slave (17) will be received by its master and will be received by the other master where it will arrive more attenuated due to being a greater distance away in terms of the length of electric cable. If this attenuation is sufficient, the transmission of the slave node will not affect the reception of the other master, so that the two groups of nodes can share the channel without interference between them.

Another possible configuration is for several nodes to communicate using certain frequencies and another group of nodes to use other different frequencies, in such a way that there is no communication or interference between the two groups of nodes.

In the majority of OFDM systems, the use of a cyclic prefix is known, consisting of repeating the last samples of the symbol at the beginning of it. This is done in order to prevent inter-symbol interference (ISI) caused by delay-spread of the channel, for which the length of the cyclic prefix has to be greater than that delay-spread. It is evident that each channel will have its own delay-spread, so it is normal to use a cyclic prefix that is sufficiently large for the majority of channels. Depending on the application of the system, different types of channel can be found, such as medium or low tension channels, access channels or in home channels, which statistically present different delay-spreads.

Typically, in the electrical network, the delay-spread is less in the medium tension lines and in connections within the same home than in the access sections. Because of all this, it is an advantage to have a system in which the duration of the cyclic prefix can be varied and thereby be able to exploit the characteristics of each channel better. Therefore, the procedure of the invention provides that this modification can be done by using, in this example of embodiment of the invention, the block (19) for inserting the cyclic prefix in a configurable way and multiplying the signal by a raised cosine window.

The invention claimed is:

1. A method comprising:
receiving a first orthogonal frequency division multiplexing signal via a transceiver;
applying a first power mask to the first orthogonal frequency division multiplexing signal to generate a first carrier modified signal, wherein the applying of the first power mask includes adjusting (i) a shape of a first frequency spectrum of the first orthogonal frequency division multiplexing signal, and (ii) power levels of frequency carriers of the first orthogonal frequency division multiplexing signal;
applying an inverse fast Fourier transform to the first carrier modified signal to generate a first time-domain signal;
adjusting a duration of a first cyclic prefix based on a delay spread of a channel of the first orthogonal frequency division multiplexing signal;
inserting the first cyclic prefix in the first time-domain signal;
multiplying the first time-domain signal by at least one cosine window to generate a second time-domain signal;
adjusting a first set of parameters of the first orthogonal frequency division multiplexing signal based on (i) a first regulation associated with a first country, and (ii) a first channel type to generate a first digital signal, wherein the first set of parameters includes (i) a first bandwidth, (ii) a first shape of a first spectrum, (iii) a first power level of the first spectrum, and (iv) a first position of the first spectrum, and
wherein adjusting the first set of parameters comprises
adjusting bandwidth of the second time-domain signal by interpolating the second time-domain signal based on a first factor to generate a first interpolated signal, and
adjusting spectral position of the first interpolated signal to generate the first digital signal, the adjusting of the spectral position comprising baseband-to-bandpass converting the first interpolated signal based on a first translation frequency;
converting the first digital signal to a first analog signal (i) via a digital-to-analog converter, and (ii) based on a sampling frequency;
receiving a second orthogonal frequency division multiplexing signal via the transceiver;
adjusting a second set of parameters of the second orthogonal frequency division multiplexing signal based on (i) a second regulation associated with a second country, and (ii) a second channel type to generate a second digital signal, wherein the second country is different than the first country, and wherein the second set of parameters includes (i) a second bandwidth, (ii) a second shape of a second spectrum of the second orthogonal frequency division multiplexing signal, (iii) a second power level of the second spectrum, and (iv) a second position of the second spectrum;
converting the second digital signal to a second analog signal via (i) the digital-to-analog converter, and (ii) based on the sampling frequency,
wherein the second digital signal is converted to the second analog signal without altering the sampling frequency used to convert the first digital signal to the first analog signal;
decreasing the first factor to increase the bandwidth for the first orthogonal frequency division multiplexing signal; and
increasing the first factor to decrease the bandwidth for the first orthogonal frequency division multiplexing signal.

2. The method of claim 1, wherein the applying of the first power mask introduces frequency gaps in the first frequency spectrum of the first orthogonal frequency division multiplexing signal.

3. The method of claim 1, wherein the applying of the first power mask comprises (i) narrowing a bandwidth of the first orthogonal frequency division multiplexing signal, and (ii) compensating for attenuation of the channel of the first orthogonal frequency division multiplexing signal.

4. The method of claim 1, wherein the multiplying the first time-domain signal by the at least one cosine window comprises multiplying each symbol of the first time-domain signal by a respective cosine window.

5. The method of claim 1, wherein the multiplying the first time-domain signal by the at least one cosine window comprises (i) adjusting gaps of the first frequency spectrum of the first orthogonal frequency division multiplexing signal, and (ii) reducing side lobes.

6. The method of claim 1, further comprising:
applying the first power mask to the first orthogonal frequency division multiplexing signal according to the first regulation associated with the first country;
applying a second power mask to the second orthogonal frequency division multiplexing signal to generate a second carrier modified signal according to the second regulation associated with the second country;

converting the second carrier modified signal to the second digital signal; and converting the second digital signal to the second analog signal via the digital-to-analog converter and based on the sampling frequency.

7. The method of claim 6, wherein:

the applying of the second power mask includes adjusting (i) a shape of the second spectrum, and (ii) power levels of frequency carriers of the second orthogonal frequency division multiplexing signal;

the first shape of the first frequency spectrum is different than the second shape of the second spectrum; and the power levels of the frequency carriers of the first orthogonal frequency division multiplexing signal are different than the power levels of the frequency carriers of the second orthogonal frequency division multiplexing signal.

8. The method of claim 6, further comprising:

applying an inverse fast Fourier transform to the second carrier modified signal to generate a third time-domain signal;

inserting a second cyclic prefix in the third time-domain signal;

multiplying the third time-domain signal by at least one cosine window to generate a fourth time-domain signal;

adjusting, based on a second factor, bandwidth of the fourth time-domain signal by interpolating the fourth time-domain signal to generate a second interpolated signal, wherein the second factor is based on the second regulation associated with the second country; and adjusting spectral position of the second interpolated signal to generate the second digital signal, wherein the adjusting of the spectral position of the second interpolated signal comprises baseband-to-bandpass converting the second interpolated signal based on a second translation frequency, and wherein the second translation frequency is based on the second regulation associated with the second country.

9. The method of claim 8, wherein:

the bandwidth of the second time-domain signal and the spectral position of the first interpolated signal is adjusted to adjust a frequency range of the first analog signal according to the first regulation associated with the first country; and the bandwidth of the fourth time-domain signal and the spectral position of the second interpolated signal is adjusted to adjust a frequency range of the second analog signal according to the second regulation associated with the second country.

10. The method of claim 1, further comprising adjusting length of the first cyclic prefix based on the first channel type.

11. The method of claim 1, further comprising:

inserting the first cyclic prefix in the first time-domain signal based on the first channel type;

based on the second channel type, inserting a second cyclic prefix in a third time-domain signal associated with the second orthogonal frequency division multiplexing signal to generate a fourth time-domain signal;

converting the fourth time-domain signal to the second digital signal; and converting the second digital signal to the second analog signal via the digital-to-analog converter based on the sampling frequency.

12. The method of claim 11, further comprising:

applying a second power mask to the second orthogonal frequency division multiplexing signal to generate a second carrier modified signal;

applying an inverse fast Fourier transform to the second carrier modified signal to generate the third time-domain signal;

multiplying the third time-domain signal by at least one cosine window to generate the fourth time-domain signal;

adjusting bandwidth of the fourth time-domain signal by interpolating the third time-domain signal based on a second factor to generate a second interpolated signal; and adjusting spectral position of the second interpolated signal to generate the second digital signal, wherein the adjusting of the spectral position of the second interpolated signal comprises baseband-to-bandpass converting the second interpolated signal based on a second translation frequency.

13. The method of claim 1, further comprising:

receiving the second orthogonal frequency division multiplexing signal;

converting, based on the sampling frequency, the second orthogonal frequency division multiplexing signal to a digital signal via an analog-to-digital converter;

bandpass-to-baseband converting, based on a second translation frequency, the digital signal to generate a baseband signal;

decimating, based on a second factor, the baseband signal to generate a decimated signal; and fast Fourier transforming the decimated signal.

14. A method comprising:

receiving a first orthogonal frequency division multiplexing signal via a transceiver;

applying a first power mask to the first orthogonal frequency division multiplexing signal to generate a first carrier modified signal;

applying an inverse fast Fourier transform to the first carrier modified signal to generate a first time-domain signal;

multiplying the first time-domain signal by at least one cosine window to generate a second time-domain signal;

adjusting a first set of parameters of the first orthogonal frequency division multiplexing signal based on (i) a first regulation associated with a first country, and (ii) a first channel type to generate a first digital signal, wherein the first set of parameters includes (i) a first bandwidth, (ii) a first shape of a first spectrum of the first orthogonal frequency division multiplexing signal, (iii) a first power level of the first spectrum, and (iv) a first position of the first spectrum, and wherein adjusting the first set of parameters comprises adjusting bandwidth of the second time-domain signal by interpolating the second time-domain signal based on a first factor to generate a first interpolated signal, and adjusting spectral position of the first interpolated signal to generate the first digital signal;

converting the first digital signal to a first analog signal (i) via a digital-to-analog converter, and (ii) based on a sampling frequency of the digital-to-analog converter;

receiving a second orthogonal frequency division multiplexing signal via the transceiver;

adjusting a second set of parameters of the second orthogonal frequency division multiplexing signal based on (i) a second regulation associated with a second country, and (ii) a second channel type to generate a second digital signal, wherein the second country is different than the first country, and wherein the second set of parameters includes (i) a second bandwidth, (ii) a second shape of a second spectrum of the second orthogonal frequency division multiplexing signal, (iii) a second power level of the second spectrum, and (iv) a second position of the second spectrum;

converting the second digital signal to a second analog signal via (i) the digital-to-analog converter, and (ii) based on the sampling frequency, wherein the second digital signal is converted to the second analog signal without altering the sampling frequency used to convert the first digital signal to the first analog signal;

decreasing the first factor to increase the bandwidth for the first orthogonal frequency division multiplexing signal; and increasing the first factor to decrease the bandwidth for the first orthogonal frequency division multiplexing signal.

15. The method of claim 14, wherein each of the first regulation and the second regulation comprise a frequency range, an injected power and a radiated power.

16. The method of claim 14, wherein:
the adjusting of the first set of parameters comprises
adjusting a duration of a first cyclic prefix based on a delay spread of a channel of the first orthogonal frequency division multiplexing signal, and
inserting the first cyclic prefix in the first time-domain signal; and
the first digital signal is generated based on the first time-domain signal.

17. The method of claim 16, wherein:
the adjusting of the second set of parameters comprises
adjusting a duration of a second cyclic prefix based on a delay spread of a channel of the second orthogonal frequency division multiplexing signal, and
inserting the second cyclic prefix in the second time-domain signal; and
the second digital signal is generated based on the second time-domain signal.

18. The method of claim 17, wherein the channel of the first orthogonal frequency division multiplexing signal is different than the channel of the second orthogonal frequency division multiplexing signal.

19. The method of claim 14, wherein:
the first orthogonal frequency division multiplexing signal is received via a masking device; and
the second orthogonal frequency division multiplexing signal is received via the masking device.

* * * * *